T. MOORE.
Broom Head.
No. 60,038.
Patented Nov. 27, 1866.
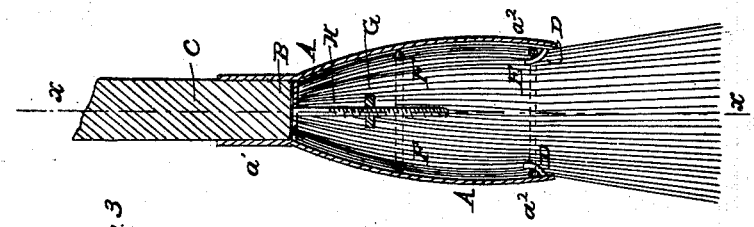
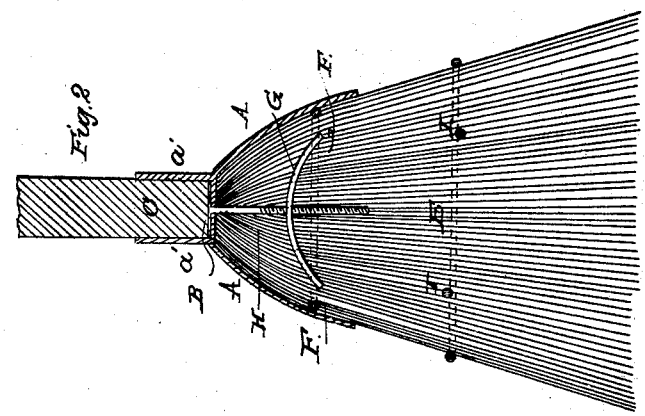
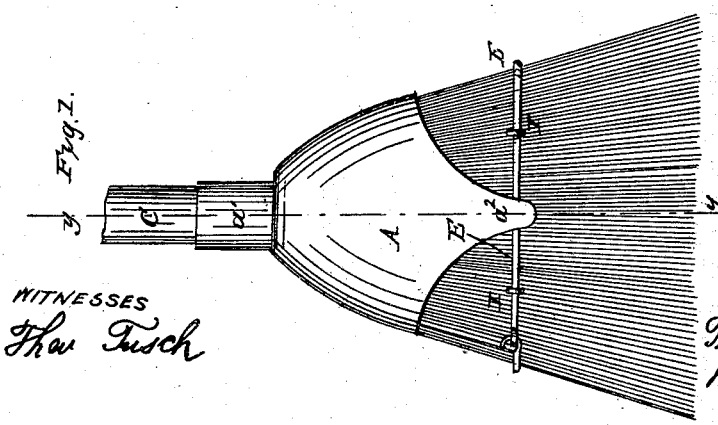
WITNESSES
INVENTOR

UNITED STATES PATENT OFFICE.

THOMAS MOORE, OF BLOOMINGTON, ILLINOIS, ASSIGNOR TO JACKSON HUKILL, OF SAME PLACE.

IMPROVED BROOM-HEAD.

Specification forming part of Letters Patent No. 60,038, dated November 27, 1866.

*To all whom it may concern:*

Be it known that I, THOMAS MOORE, of Bloomington, in the county of McLean and State of Illinois, have invented a new and useful Improvement in Broom-Head; and I do hereby declare that the following is a full, clear, and exact description thereof, which will enable others skilled in the art to make and use the same, reference being had to the accompanying drawings, forming a part of this specification, in which—

Figure 1 is a side view of my improved broom-head, showing it in connection with the handle and brush. Fig. 2 is a longitudinal section of the same, taken through the line $x\ x$, Fig. 3. Fig. 3 is a longitudinal section of the same, taken through the line $y\ y$, Fig. 1.

Similar letters of reference indicate like parts.

My invention has for its object to furnish an improved broom-head which may be readily filled and refilled, and which will hold the corn firmly and securely in place; and it consists in the combination of certain parts, as will be hereinafter more fully described.

A is the main part of the broom-head. This may be cast in one piece, or it may be made of several pieces of sheet metal, cut out and struck up into the proper form, and then soldered together, so as to form a solid broom-head.

At the point where the socket $a^1$ joins the part A, a plate, B, extends across the broom-head, as shown. This forms the bottom of the socket, against which the end of the handle C abuts when the broom is being put together.

The sides of the part A are made with downwardly-projecting parts or ears $a^2$, as shown in Figs. 1 and 3, to support the sides of the brush, and give greater firmness to the broom. To the inner sides of these ears $a^2$, near their ends, are attached hooks D, which hook over the binding-wire E, holding it securely ni place.

To the inner surface of the broom-head A, around its upper part, is attached a wire, F, forming a ledge, against which the corn is forced by the action of the crescent-shaped nut G, and firmly secured.

H is a screw securely attached to the end of the handle C, and passing down into the broom-head through a hole pierced in the bottom B of the socket $a^1$, as shown in Figs. 2 and 3. G is a crescent-shaped nut, into which the screw H enters, and which is drawn up by said screw, clamping the corn between said nut and the wire ledge F, and holding it securely in place.

The binding-wire E passes around the corn, as shown in the drawings. Its ends are bent over so as to form hooks, by which they are connected, as shown in Fig. 1; and it is held in place and prevented from slipping down by the hooks D, as before described. It is also further secured in place and shape by the keys I, which have hooks upon their ends, and which pass through the corn and hook upon the binding-wire E, as shown in Figs. 1 and 2.

In filling the broom-head the handle C is put into its place, with the nut G upon the lower end of the screw H. The corn is then inserted, and when the head A is filled the nut G is drawn up by turning the handle C. This clamps the corn securely between the nut G and the ledge F upon the inside of the head A. The binding-wire E is then applied and passed over the hooks D, and the formation of the broom completed by inserted the keys I.

What I claim as new, and desire to secure by Letters Patent, is—

The combination of the part A with its ears $a^2$, hooks D, wires E, wire F, crescent nut G, screw H, socket $a^1$, and handle C, and keys I, in the manner as and for the purpose specified.

THOMAS MOORE.

Witnesses:
   G. FERRE,
   I. G. REYBURN.